US009957386B2

(12) United States Patent
Cartier

(10) Patent No.: US 9,957,386 B2
(45) Date of Patent: May 1, 2018

(54) ANTISTATIC THERMOPLASTIC STARCH ALLOYS

(71) Applicant: Arkema Inc., King of Prussia, PA (US)

(72) Inventor: Laurent B. Cartier, Wayne, PA (US)

(73) Assignee: Arkema Inc., King of Prussia, PA (US)

( * ) Notice: Subject to any disclaimer, the term of this patent is extended or adjusted under 35 U.S.C. 154(b) by 0 days. days.

(21) Appl. No.: 14/917,085

(22) PCT Filed: Sep. 10, 2014

(86) PCT No.: PCT/US2014/054873
§ 371 (c)(1),
(2) Date: Mar. 7, 2016

(87) PCT Pub. No.: WO2015/038560
PCT Pub. Date: Mar. 19, 2015

(65) Prior Publication Data
US 2016/0215137 A1    Jul. 28, 2016

Related U.S. Application Data

(60) Provisional application No. 61/875,796, filed on Sep. 10, 2013.

(51) Int. Cl.
C08L 3/02        (2006.01)
C08L 77/00       (2006.01)
C08L 75/08       (2006.01)
C08L 55/02       (2006.01)
C08L 23/00       (2006.01)
C08L 87/00       (2006.01)
C09D 5/03        (2006.01)
C08L 23/10       (2006.01)
C08L 23/12       (2006.01)
C08G 69/40       (2006.01)

(52) U.S. Cl.
CPC .............. C08L 55/02 (2013.01); C08L 23/00 (2013.01); C08L 23/10 (2013.01); C08L 23/12 (2013.01); C08L 87/005 (2013.01); C09D 5/03 (2013.01); C08G 69/40 (2013.01); C08L 3/02 (2013.01); C08L 77/00 (2013.01); C08L 2205/03 (2013.01); C08L 2207/04 (2013.01)

(58) Field of Classification Search
CPC ............. C08L 3/02; C08L 77/00; C08L 75/08
See application file for complete search history.

(56) References Cited

U.S. PATENT DOCUMENTS

| | | | | |
|---|---|---|---|---|
| 5,095,054 A * | 3/1992 | Lay | ........................ | A01N 25/10 264/328.14 |
| 5,338,795 A | 8/1994 | Fukumoto et al. | | |
| 5,349,000 A * | 9/1994 | Robeson | ................. | C08L 29/04 524/386 |
| 5,965,206 A | 10/1999 | Hilti et al. | | |
| 6,573,340 B1 * | 6/2003 | Khemani | ................ | B32B 27/06 428/480 |
| 6,821,588 B1 * | 11/2004 | Hammer | ............ | A22C 13/0013 138/118.1 |
| 6,825,270 B1 * | 11/2004 | Lacroix | ................... | C08L 25/06 525/66 |
| 9,452,595 B2 * | 9/2016 | Cartier | ................. | B32B 27/308 |
| 2002/0028857 A1 * | 3/2002 | Holy | ...................... | B29C 49/00 523/124 |
| 2004/0143068 A1 * | 7/2004 | Honda | .................. | C08F 259/08 525/199 |
| 2007/0231554 A1 * | 10/2007 | Bastioli | ................ | A01K 15/026 428/219 |
| 2011/0112219 A1 * | 5/2011 | Schachtely | .............. | C08J 3/226 523/351 |
| 2011/0118390 A1 * | 5/2011 | Feron | ......................... | C08J 3/18 524/47 |
| 2011/0196071 A1 * | 8/2011 | Mentink | .................. | A23G 4/08 524/51 |
| 2011/0305886 A1 | 12/2011 | Phan et al. | | |
| 2012/0022188 A1 | 1/2012 | Changping et al. | | |
| 2012/0059097 A1 * | 3/2012 | Liao | ......... | C08L 3/02 524/112 |
| 2012/0108694 A1 | 5/2012 | Malet et al. | | |
| 2012/0139154 A1 * | 6/2012 | Huneault | ................. | B29B 7/46 264/211.23 |
| 2012/0150137 A1 * | 6/2012 | Wang | .................. | B29C 47/0021 604/385.29 |
| 2012/0219781 A1 | 8/2012 | Babin et al. | | |
| 2012/0283364 A1 | 11/2012 | Sarazin et al. | | |
| 2014/0087106 A1 * | 3/2014 | Law | .......... | C08L 3/02 428/35.5 |
| 2014/0272370 A1 * | 9/2014 | Broyles | .................. | C08L 23/06 428/220 |
| 2015/0147551 A1 | 5/2015 | Brule et al. | | |
| 2015/0166746 A1 | 6/2015 | Brule et al. | | |
| 2015/0376393 A1 * | 12/2015 | Bastioli | .................... | C08K 5/10 524/52 |

FOREIGN PATENT DOCUMENTS

JP    2009062450 A  *  3/2009

OTHER PUBLICATIONS

Husken et al. Journal of Polymer Science: Part A: Polymer Chemistry, vol. 45, 4522-4535 (2007).*
Machine Translation of JP 2009062450 A, 2017.*

* cited by examiner

Primary Examiner — Liam J Heincer
(74) Attorney, Agent, or Firm — Thomas Roland

(57) ABSTRACT

The invention relates to the use of an alloy of thermoplastic starch and a hydrophilic thermoplastic elastomer as an anti-static additive. The additive improves the anti-static properties of a polymer matrix.

9 Claims, No Drawings

ANTISTATIC THERMOPLASTIC STARCH ALLOYS

This application claims benefit, under U.S.C. § 119 or § 365 of PCT Application Number PCT/US2014/054873, filed Sep. 10, 2014; and U.S. Provisional Application Number 61/875,796, filed Sep. 10, 2013, said applications incorporated herein by reference.

FIELD OF THE INVENTION

The invention relates to the use of an alloy of thermoplastic starch and a hydrophilic thermoplastic elastomer as an anti-static additive. The additive improves the anti-static properties of a polymer matrix.

BACKGROUND OF THE INVENTION

With the increasing awareness for sustainability and the environment, natural polymers have been the focus of much research. Much research has been directed at forming polymeric materials made of, or derived from, renewable biological materials.

Starch is an abundant, inexpensive, renewable natural polymer derived from plants. The glass transition temperature of pure dry starch is above its decomposition temperature, and therefore starch does not soften and flow, making it difficult to process. However, starch can be plasticized with relatively low levels (5-50 weight percent, preferably 10-40 weight percent, and most preferably from 10 to 30 weight percent) of plasticizers to produce thermoplastic starch (TPS) which will flow at elevated temperatures. Useful plasticizers are those that are capable of hydrogen bonding with the starch hydroxyl groups, such as water, and polyhydric alcohols like glycerol, ethylene glycol, mannitol and sorbitol.

While thermoplastic starch flows at high temperatures, it is a very brittle material, difficult to process, and the properties are poor in high humidity. The properties of TPS can be significantly improved by blending with other natural and synthetic polymers. Unfortunately, hydrophilic TPS is difficult to combine with hydrophobic polymers, such as polyolefins and other petroleum-derived polymers, leading a discontinuous, multi-stage morphology and poor mechanical properties. US 2012/0022188 describes blends of TPS with very low density polyolefin. The blend has a co-continuous phase morphology, and requires ethylene acrylic acid copolymer as a compatibilizer. Films of the blend were found to have excellent anti-static properties.

Blends of thermoplastic starch with thermoplastic elastomers has resulted in the formation of breathable films US 2012-0219781, FR 12.56142 and FR 12.56143. The formation and retention of static electricity charges at the surface of most plastics are known. For example, the presence of static electricity on thermoplastic films causes these films to stick to one another, making it difficult to separate them. The presence of static electricity on packaging films can cause the accumulation of dust on the objects to be packaged and thus impair their use. Static electricity can also damage microprocessors or components of electronic circuits. Static electricity can also cause the combustion or explosion of inflammable materials such as, for example, expandable polystyrene beads which contain pentane.

Antistatic agents for polymers are generally ionic surfactants of the ethoxylated amine or sulfonate type which are added to the polymers. However, the antistatic properties of the polymers incorporating these surfactants depend on the ambient humidity and they are not therefore permanent. This is because these surfactants have a tendency to migrate to the surface of the polymers and then to disappear.

Copolymers comprising polyamide blocks and hydrophilic blocks form antistatic agents which have the advantage of not migrating. Their antistatic properties are permanent and independent of the ambient humidity. U.S. Pat. Nos. 5,338,795, 5,965,206 and 6,825,270 all describe polymer substrates made antistatic by adding a copolymer comprising polyether blocks and polyamide blocks to their composition.

Thermoplastic elastomers (TPE) are used in the field of electronics alone and as additives, for their property of exceptional elastic springback. In applications of this type, the parts must be able to withstand both a high pressure and a high temperature so as not to risk being damaged, spoiled or deformed, nor to have their mechanical properties modified.

Thermoplastic elastomers, including block copolymers having polyether blocks and polyamide blocks such as PEBAX resins from Arkema, have good anti-static properties (surface resistivity of $10^9$). US 2012/0108694 describes the improvement of the antistatic properties of PEBAX using organic salts (to $10^7$). However, the use of salts can be detrimental to the use of the resin in food or medical applications.

It is desired to provide a thermoplastic plastic additive having improved anti-static properties. It has now surprisingly been found that alloys of thermoplastic elastomers and TPS can provide a 10 fold higher level of surface resistivity over the thermoplastic elastomer alone. Additionally, the TPS/TPE alloy is cost effective compared to the TPE alone, and increases the bio-based content of the final product. The anti-static additive is added at from 5 to 40 weight percent into a polymer matrix, providing both anti-static and mechanical enhancement.

SUMMARY OF THE INVENTION

The invention relates to a polymer composition comprising a blend of:
a) a polymer matrix, and
b) 5-40 weight percent (based on the total polymer composition) comprising a TPS/TPE alloy of:
  1) 10 to 90 weight percent of thermoplastic starch (TPS);
  2) 10 to 90 weight percent of a hydrophilic thermoplastic elastomer (TPE);
c) optionally up to 5 weight percent of other additives.

DETAILED DESCRIPTION OF THE INVENTION

The invention relates to a thermoplastic starch/thermoplastic elastomer alloy that is blended into a polymer matrix to provide improved anti-static properties, as well as improved mechanical (impact) properties.

Unless otherwise noted, all percentages herein are weight percentages, and molecular weight is a weight average molecular weight by GPC using an appropriate standard.

All references cited are incorporated herein by reference.
TPS/TPE alloy:

Thermoplastic elastomer polymer (TPE) is understood to mean a block copolymer alternately comprising "hard" or "rigid" blocks or segments (with a rather thermoplastic behavior) and "soft" or "flexible" blocks or segments (with a rather elastomeric behavior). The thermoplastic elastomer polymers which can be used in the alloy according to the invention can be chosen from (a) copolymers comprising polyester blocks and polyether blocks (hereinafter COPEs or copolyetheresters), (b) copolymers comprising polyurethane blocks and polyether or polyester blocks (also known as TPUs, abbreviation of thermoplastic polyurethanes) and (c) copolymers comprising polyamide blocks and polyether blocks (also known as PEBAs according to the IUPAC).

Hydrophilic TPE is understood to mean a TPE comprising at least 10% by weight, preferably at least 20% by weight, preferably at least 30% by weight, preferably at least 40% by weight, preferably at least 50% by weight, of polyethylene glycol (PEG), with regard to the weight of the TPE.

Regarding the COPEs or copolyetheresters, these are copolymers comprising polyester blocks and polyether blocks. They are composed of soft polyether blocks resulting from polyetherdiols and of rigid polyester blocks which result from the reaction of at least one dicarboxylic acid with at least one chain-lengthening short diol unit. The polyester blocks and the polyether blocks are connected via ester bonds resulting from the reaction of the acid functional groups of the dicarboxylic acid with the OH functional groups of the polyetherdiol. The linking of the polyethers and diacids forms the soft blocks while the linking of the glycol or butanediol with the diacids forms the rigid blocks of the copolyetherester. The chain-lengthening short diol can be chosen from the group consisting of neopentyl glycol, cyclohexanedimethanol and aliphatic glycols of formula $HO(CH_2)_nOH$ in which n is an integer having a value from 2 to 10.

Advantageously, the diacids are aromatic dicarboxylic acids having from 8 to 14 carbon atoms. Up to 50 mol % of the aromatic dicarboxylic acid can be replaced with at least one other aromatic dicarboxylic acid having from 8 to 14 carbon atoms and/or up to 20 mol % can be replaced with an aliphatic dicarboxylic acid having from 2 to 14 carbon atoms.

Mention may be made, as example of aromatic dicarboxylic acids, of terephthalic acid, isophthalic acid, bibenzoic acid, naphthalenedicarboxylic acid, 4,4'-diphenylenedicarboxylic acid, bis(p-carboxyphenyl)methane, ethylenebis(p-benzoic acid), 1,4-tetramethylenebis(p-oxybenzoic acid), ethylenebis(p-oxybenzoic acid) or 1,3-trimethylenebis(p-oxybenzoic acid).

Mention may be made, as example of glycols, of ethylene glycol, 1,3-trimethylene glycol, 1,4-tetramethylene glycol, 1,6-hexamethylene glycol, 1,3-propylene glycol, 1,8-octamethylene glycol, 1,10-decamethylene glycol and 1,4-cyclohexanedimethanol. The copolymers comprising polyester blocks and polyether blocks are, for example, copolymers having polyether units derived from polyetherdiols, such as polyethylene glycol (PEG), polypropylene glycol (PPG), polytrimethylene glycol (PO3G) or polytetramethylene glycol (PTMG), dicarboxylic acid units, such as terephthalic acid, and glycol (ethanediol) or 1,4-butanediol units. Such copolyetheresters are described in the patents EP 402 883 and EP 405 227. These polyetheresters are thermoplastic elastomers. They can comprise plasticizers.

As regards the TPUs, mention may be made of the polyetherurethanes which result from the condensation of soft polyether blocks, which are polyetherdiols, and of rigid polyurethane blocks resulting from the reaction of at least one diisocyanate, which can be chosen from aromatic diisocyanates (e.g.: MDI, TDI) and aliphatic diisocyanates (e.g.: HDI or hexamethylene diisocyanate), with at least one short diol. The chain-lengthening short diol can be chosen from the glycols mentioned above in the description of the copolyetheresters. The polyurethane blocks and the polyether blocks are connected via bonds resulting from the reaction of the isocyanate functional groups with the OH functional groups of the polyetherdiol.

Mention may also be made of the polyesterurethanes which result from the condensation of soft polyester blocks, which are polyesterdiols, and of rigid polyurethane blocks resulting from the reaction of at least one diisocyanate with at least one short diol. The polyesterdiols result from the condensation of dicarboxylic acids, advantageously chosen from aliphatic dicarboxylic acids having from 2 to 14 carbon atoms, and of glycols which are chain-lengthening short diols chosen from the glycols mentioned above in the description of the copolyetheresters. They can comprise plasticizers.

As regards the "PEBAs", or copolymers comprising polyether blocks and polyamide blocks, they result from the polycondensation of polyamide blocks comprising reactive ends with polyether blocks comprising reactive ends, such as, inter alia:

1) polyamide blocks comprising diamine chain ends with polyoxyalkylene blocks comprising dicarboxyl chain ends;
2) polyamide blocks comprising dicarboxyl chain ends with polyoxyalkylene blocks comprising diamine chain ends, which are obtained by cyanoethylation and hydrogenation of aliphatic $\alpha,\omega$-dihydroxylated polyoxyalkylene blocks, known as polyetherdiols;
3) polyamide blocks comprising dicarboxyl chain ends with polyetherdiols, the products obtained being, in this specific case, polyetheresteramides.

The polyamide blocks comprising dicarboxyl chain ends originate, for example, from the condensation of precursors of polyamides in the presence of a chain-limiting dicarboxylic acid. The polyamide blocks comprising diamine chain ends originate, for example, from the condensation of precursors of polyamides in the presence of a chain-limiting diamine.

The number-average molar mass Mn of the polyamide blocks is between 400 and 20 000 g/mol, preferably between 500 and 10 000 g/mol.

The polymers comprising polyamide blocks and polyether blocks can also comprise randomly distributed units.

Use may be advantageously made of three types of polyamide blocks.

According to a first type, the polyamide blocks originate from the condensation of a dicarboxylic acid, in particular those having from 4 to 20 carbon atoms, preferably those having from 6 to 18 carbon atoms, and of an aliphatic or aromatic diamine, in particular those having from 2 to 20 carbon atoms, preferably those having from 6 to 14 carbon atoms.

Mention may be made, as examples of dicarboxylic acids, of 1,4-cyclohexanedicarboxylic acid, butanedioic, adipic, azelaic, suberic, sebacic, dodecanedicarboxylic and octadecanedicarboxylic acids and terephthalic and isophthalic acids, but also dimerized fatty acids.

Mention may be made, as examples of diamines, of tetramethylenediamine, hexamethylenediamine, 1,10-decamethylenediamine, dodecamethylenediamine, trimethylhexamethylenediamine, the isomers of bis(4-aminocyclohexyl)methane (BACM), bis(3-methyl-4-aminocyclohexyl)methane (BMACM), and 2,2-bis(3-methyl-4-aminocyclohexyl)propane (BMACP), and di(para-aminocyclohexyl)methane (PACM), and isophoronediamine (IPDA), 2,6-bis(aminomethyl)norbornane (BAMN) and piperazine (Pip).

The following blocks advantageously exist: PA4.12, PA4.14, PA4.18, PA6.10, PA6.12, PA6.14, PA6.18, PA9.12, PA10.10, PA10.12, PA10.14 and PA10.18, the first figure indicating the number of carbon atoms of the diamine and the second figure indicating the number of carbon atoms of the dicarboxylic acid.

According to a second type, the polyamide blocks result from the condensation of one or more α,ω-aminocarboxylic acids and/or of one or more lactams having from 6 to 12 carbon atoms in the presence of a dicarboxylic acid having from 4 to 12 carbon atoms or of a diamine. Mention may be made, as examples of lactams, of caprolactam, oenantholactam and lauryllactam. Mention may be made, as examples of α,ω-aminocarboxylic acid, of aminocaproic, 7-aminoheptanoic, 11-aminoundecanoic and 12-aminododecanoic acids.

Advantageously, the polyamide blocks of the second type are of polyamide 11, of polyamide 12 or of polyamide 6.

According to a third type, the polyamide blocks result from the condensation of at least one α,ω-aminocarboxylic acid (or one lactam), at least one diamine and at least one dicarboxylic acid.

In this case, the polyamide PA blocks are prepared by polycondensation:
- of the linear aliphatic or aromatic diamine or diamines having X carbon atoms;
- of the dicarboxylic acid or acids having Y carbon atoms; and
- of the comonomer or comonomers {Z} chosen from the lactams and the α,ω-aminocarboxylic acids having Z carbon atoms and the equimolar mixtures of at least one diamine having X1 carbon atoms and of at least one dicarboxylic acid having Y1 carbon atoms, (X1, Y1) being different from (X, Y),
- said comonomer or comonomers {Z} being introduced in a proportion by weight ranging up to 50%, preferably up to 20% and more advantageously still up to 10%, with respect to the combined polyamide precursor monomers;
- in the presence of a chain-limiting agent chosen from dicarboxylic acids.

Use is advantageously made, as chain-limiting agent, of the dicarboxylic acid having Y carbon atoms, which is introduced in excess with respect to the stoichiometry of the diamine or diamines.

According to an alternative form of this third type, the polyamide blocks result from the condensation of at least two α,ω-aminocarboxylic acids or of at least two lactams having from 6 to 12 carbon atoms or of a lactam and of an aminocarboxylic acid not having the same number of carbon atoms, in the optional presence of a chain-limiting agent. Mention may be made, as examples of aliphatic α,ω-aminocarboxylic acid, of aminocaproic, 7-aminoheptanoic, 11-aminoundecanoic and 12-aminododecanoic acids. Mention may be made, as examples of a lactam, of caprolactam, oenantholactam and lauryllactam. Mention may be made, as examples of aliphatic diamines, of hexamethylenediamine, dodecamethylenediamine and trimethylhexamethylenediamine. Mention may be made, as example of cycloaliphatic diacids, of 1,4-cyclohexanedicarboxylic acid. Mention may be made, as examples of aliphatic diacids, of butanedioic, adipic, azelaic, suberic, sebacic and dodecanedicarboxylic acids, dimerized fatty acids (these dimerized fatty acids preferably have a dimer content of at least 98%; preferably, they are hydrogenated; they are sold under the Pripol® trade name by Uniqema or under the Empol® trade name by Henkel) and polyoxyalkylene-α,ω-diacids. Mention may be made, as examples of aromatic diacids, of terephthalic (T) and isophthalic (I) acids. Mention may be made, as examples of cycloaliphatic diamines, of the isomers of bis(4-aminocyclohexyl)methane (BACM), bis(3-methyl-4-aminocyclohexyl)methane (BMACM), and 2,2-bis(3-methyl-4-aminocyclohexyl)propane (BMACP), and di(para-aminocyclohexyl)methane (PACM). The other diamines commonly used can be isophoronediamine (IPDA), 2,6-bis(aminomethyl)norbornane (BAMN) and piperazine.

Mention may be made, as examples of polyamide blocks of the third type, of the following:
- 6.6/6 in which 6.6 denotes hexamethylenediamine units condensed with adipic acid and 6 denotes units resulting from the condensation of caprolactam.
- 6.6/6.10/11/12 in which 6.6 denotes hexamethylenediamine condensed with adipic acid, 6.10 denotes hexamethylenediamine condensed with sebacic acid, 11 denotes units resulting from the condensation of aminoundecanoic acid and 12 denotes units resulting from the condensation of lauryllactam.

Preferably, the polymer comprises from 1% to 80% by weight of polyether blocks and from 20% to 99% by weight of polyamide blocks, preferably from 4% to 80% by weight of polyether blocks and from 20% to 96% by weight of polyamide blocks and more preferably from 30% to 60% by weight of polyether blocks and from 40% to 70% by weight of polyamide blocks. The mass Mn of the polyether blocks is between 100 and 6000 g/mol and preferably between 200 and 3000 g/mol.

The polyether blocks consist of alkylene oxide units. These units can, for example, be ethylene oxide units, propylene oxide units or tetrahydrofuran units (which results in the polytetramethylene glycol sequences). Use is thus made of PEG (polyethylene glycol) blocks, that is to say those consisting of ethylene oxide units, PPG (polypropylene glycol) blocks, that is to say those consisting of propylene oxide units, PO3G (polytrimethylene glycol) blocks, that is to say those consisting of polytrimethylene ether glycol units (such copolymers with polytrimethylene ether blocks are described in the document U.S. Pat. No. 6,590,065), and PTMG blocks, that is to say those consisting of tetramethylene glycol units, also known as polytetrahydrofuran blocks. The PEBA copolymers can comprise several types of polyethers in their chain, it being possible for the copolyethers to be block or random copolyethers. The permeability to water vapor of the PEBA copolymer increases with the amount of polyether blocks and varies as a function of the nature of these blocks. It is preferable to use a polyethylene glycol polyether block which makes it possible to obtain a PEBA exhibiting good permeability.

The polyether blocks can also consist of ethoxylated primary amines. Mention may be made, as examples of ethoxylated primary amines, of the products of formula:

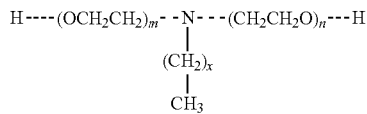

n which m and n are between 1 and 20 and x is between 8 and 18. These products are commercially available under the Noramox® trade name from CECA and under the Genamin® trade name from Clariant.

The soft polyether blocks can comprise polyoxyalkylene blocks comprising $NH_2$ chain ends, it being possible for such blocks to be obtained by cyanoacetylation of aliphatic α,ω-dihydroxylated polyoxyalkylene blocks, known as polyetherdiols. More particularly, use may be made of Jeffamines (for example, Jeffamine® D400, D2000, ED 2003 or XTJ 542, commercial products from Huntsman, also described in the documents of patents JP 2004346274, JP 2004352794 and EP 1 482 011).

The polyetherdiol blocks are either used as is and copolycondensed with polyamide blocks comprising carboxyl ends or they are aminated in order to be converted into polyetherdiamines and condensed with polyamide blocks comprising carboxyl ends. The general method for the two-stage preparation of PEBA copolymers having ester bonds between the PA blocks and the PE blocks is known and is described, for example, in the French patent FR 2 846 332. The general method for the preparation of the PEBA copolymers of the invention having amide bonds between the PA blocks and the PE blocks is known and described, for example, in the European patent EP 1 482 011. Polyether blocks may also be mixed with polyamide precursors and a chain-limiting diacid in order to prepare polymers comprising polyamide blocks and polyether blocks having randomly distributed units (one-stage process).

Of course, the designation PEBA in the present description of the invention relates equally well to the PEBAX® products sold by Arkema, to the Vestamid® products sold by Evonik®, to the Grilamid® products sold by EMS, to the Kellaflex® products sold by DSM or to any other PEBA from other suppliers.

Advantageously, the PEBA copolymers have PA blocks of PA6, of PA11, of PA12, of PA6.12, of PA6.6/6, of PA10.10 and/or of PA6.14, preferably PA11 and/or PA12 blocks; and PE blocks of PTMG, of PPG and/or of PO3G. The PEBAs based on PE blocks consisting predominantly of PEG are to be ranked in the range of the hydrophilic PEBAs. The PEBAs based on PE blocks consisting predominantly of PTMG are to be ranked in the range of the hydrophobic PEBAs.

Advantageously, said PEBA used in the composition according to the invention is obtained, at least partially, from bioresourced starting materials. Starting materials of renewable origin or bioresourced starting materials is understood to mean substances which comprise bioresourced carbon or carbon of renewable origin. Specifically, unlike the substances resulting from fossil materials, the substances composed of renewable starting materials comprise $^{14}C$. The "content of carbon of renewable origin" or "content of bioresourced carbon" is determined by application of the standards ASTM D 6866 (ASTM D 6866-06) and ASTM D 7026 (ASTM D 7026-04). By way of example, the PEBAs based on polyamide 11 originate at least in part from bioresourced starting materials and exhibit a content of bioresourced carbon of at least 1%, which corresponds to a $^{12}C/^{14}C$ isotopic ratio of at least $1.2\times10^{-14}$. Preferably, the PEBAs according to the invention comprise at least 50% by weight of bioresourced carbon with respect to the total weight of carbon, which corresponds to a $^{12}C/^{14}C$ isotopic ratio of at least $0.6\times10^{-12}$. This content is advantageously higher, in particular up to 100%, which corresponds to a $^{12}C/^{14}C$ isotopic ratio of $1.2\times10^{-12}$, in the case of PEBAs comprising PA11 blocks and PE blocks comprising PO3G, PTMG and/or PPG resulting from starting materials of renewable origin.

According to an advantageous embodiment of the invention, the hydrophilic TPE comprises:

from 1% to 100%, preferably from 50% to 100%, of copolymer comprising polyurethane blocks and PEG blocks (TPUs) and from 99% to 0%, preferably from 50% to 0%, of at least one other hydrophilic TPE chosen from copolymers comprising polyamide blocks and PEG blocks (PEBAs), copolymers comprising polyester blocks and PEG blocks (COPEs) and their blends, with regard to the weight of the hydrophilic TPE.

According to an advantageous embodiment, the alloy used in the present invention comprises at least one of these TPEs, optionally blended with at least one functionalized polyolefin. According to a specific embodiment, the alloy, and subsequently the film, according to the invention additionally comprises a functionalized polyolefin, that is to say a polyolefin comprising a grafting by a monomer chosen from the group consisting of unsaturated carboxylic acids, unsaturated carboxylic anhydrides, vinyl monomers, acrylic monomers and a mixture of these. Preferably, the (functionalized) polyolefin is chosen from the group consisting of ethylene/acrylic ester copolymers, ethylene/acrylic ester/maleic anhydride copolymers and ethylene/acrylic ester/glycidyl methacrylate copolymers, these copolymers being grafted/functionalized as described above. Advantageously, the functionalized polyolefin used is chosen from these described and claimed in patent application FR2959939A1.

Thermoplastic starch, hereinafter known as "TPS", is understood to mean native starch converted into processable material by plasticizing in the presence of a small amount of water. The plasticized starch, known as "thermoplastic starch", is obtained in particular with a nonvolatile plasticizer, such as glycerol. This material has many advantages, such as its cost, its biodegradable nature and its origin, resulting from abundant renewable resources. It can be processed with conventional devices of plastics technology. Plasticized starch unfortunately has a few significant limits, such as its high sensitivity to water, limited mechanical properties and adhesive properties, in comparison with a conventional thermoplastic, and a very lengthy aging, after the processing thereof, before stabilization of its properties (phenomena of retrogradation or densification). Its use in the form of an alloy according to the invention makes it possible to overcome these disadvantages by virtue of the formulation of starch with other compounds and the use of the process according to the invention. According to a preferred embodiment, the percentage of thermoplastic starch in the alloy used represents from 10% to 90% of the weight of the alloy, preferably from 30% to 80%, more preferably from 40% to 70% and more preferably from 50% to 70% of the weight of the alloy.

Any type of starch can be used in the invention. It can be corn, potato, wheat, tapioca or pea starch. The starch can be modified by grafting chemical groups. It can be employed in the following different forms:

native (unmodified) starch: the starch grains are the site of the semicrystalline organization of the two constituent polymers, which are amylose and amylopectin. The degree of polymerization and the proportion of amylose vary according to the botanical origin of the starch.

gelatinized starch: during heating in the vicinity of 80° C. in an aqueous medium, the starch hydrates and swells. A portion of the amylose and then of the amylopectin passes into solution (starching). The suspension then becomes viscous and the starch becomes easier to hydrolyze.

gelled starch—retrograded starch: when the temperature of the aqueous solution decreases, the system becomes gelled and then reorganized into a semicrystalline structure (retrogradation). These reorganized molecules are formed of amylose, of amylopectin and of mixed amylose/amylopectin crystals.

destructured starch, in which form the amylose and amylopectin polymers are dispersed.

In addition to the use of starch, which is a natural material, the use of PEBA polymers prepared from at least partially bioresourced polyamide and/or polyether blocks makes it possible to further increase the amount of natural materials in the film according to the invention.

The thermoplastic starch of the invention also includes thermoplastic starch with has been modified with functional groups.

The alloy according to the invention can be prepared by any method which makes it possible to obtain an intimate or homogeneous blend comprising the thermoplastic starch and said at least one hydrophilic TPE according to the invention, and optionally (a) additive(s) and/or (a) compatibilizing agent(s), such as melt compounding, extrusion, compacting or even roll mill.

More particularly, the alloy according to the invention is prepared by melt blending all the ingredients (starch, plasticizer, water, TPE and optional compatibilizer(s) and additive(s)) in a "direct" process. It is also possible to prepare the alloy according to a two-stage process, the first stage consisting in preparing a concentrated blend of the starch, plasticizer and water, in order to form a TPS matrix, and then a second stage consisting in diluting the TPS by blending with the TPE matrix.

Use is advantageously made of the normal devices for blending and kneading of the thermoplastics industry, such as extruders, extruders of twin-screw type, in particular self-cleaning engaging corotating twin-screw extruders, and kneaders, for example co-kneaders of Buss brand or internal mixers. In this process, the ingredients can either be dry blended and introduced into the feed hopper or else the hydrophilic TPE can be introduced via a side feed into the TPS or into a pre-molten starch+plasticizer+water blend.

It is recommended that the preparation of the alloys of the invention (the compounding) and the processing thereof be carried out under the mildest possible conditions in terms of temperature and shear rate.

In one preferred embodiment, the TPS and TPE alloy have a co-continuous morphology.

The TPS/TPE alloy is preferably extruded in a stream that is cut into pellets, for further processing.

Blend of TPS/TPE and a polymer:

The TPS/TPE alloy of the invention is blended as an additive into a polymer matrix at 5 to 40 weight percent of the final polymer blend composition, preferably at 5 to 30 weight percent, and more preferably at 10 to 25 weight percent.

The polymer matrix may be a thermoplastic or a thermoset. Useful matrix polymers include, but are not limited to: polyolefins, including polyethylene of all densities, polypropylene, and polybutylene; polycarbonate; polyvinyl chloride, and polyvinylidene chloride; fluoropolymers such as polyvinylidene fluoride, polyvinyl fluoride, polytetrafluorethylene, and copolymers thereof; epoxy resins; (meth) acrylic polymers and copolymers; polyesters such as polyethylene terephthalate and polybutylene terephthalate; polylactic acid; vinyl aromatic polymers, such as polystyrene, high-impact polystyrene (HIPS), acrylonitrile-butadiene-styrene (ABS) copolymers, acrylonitrile-styrene-acrylate (ASA) copolymers, styrene acrylonitrile (SAN) copolymers, methacrylate-acrylonitrile-butadiene-styrene (MABS) copolymers, styrene-butadiene copolymers (SB), styrene-butadiene-styrene block (SBS) copolymers and their partially or fully hydrogenated derivatives, styrene-isoproene copolymers styrene-isoprene-styrene (SIS) block copolymers and their partially or fully hydrogenenated derivatives, and styrene-(meth)acrylate copolymers such as styrene-methyl methacrylate copolymers (S/MMA); polyether ether ketone, polyether ketone ketone; and mixtures thereof.

Since starch will begin yellowing around 240° C., and decompose around 260° C., the polymer matrix should have a melting point or Tg of below 260° C., to allow for melt processing of the blend. The 260° C. process temperature would be used for colored product in which yellowing would not be noticed (dark colors). In one embodiment, a preferred upper range of a process temperature is 220° C., for a white product.

The blend may also include additives typically used in polymer materials, at levels of 0.01 to 5%. The additives may be added into the TPS/TFE alloy, or into the TPS/TFE and plastic matrix blend. Typical additives include, but are not limited to fillers (calcium carbonate, talc, clays) titanium dioxide, pigments and processing aids The polymer blend having the matrix polymer and the TPS/TFE alloy is formed by typical blending and forming process known in the art, such as extrusion, blow-molding, injection molding and other similar melt forming steps. In one embodiment, the TPS/TFE alloy and plastic matrix polymer are first dry blended, then mixed into a melt, to provide for better dispersion of the components.

In another embodiment, the TPS/TFE blend with the matrix polymer can be extruded and pelletized, then further melt-processed into the final objects.

In one embodiment, the final formed product exhibits a co-continuous morphology.

Use

The anti-static blend of the invention can be formed into films, sheets, fibers, and profiles. The anti-static polymer blend is especially useful for injection molded parts for use in the electronics industry that would benefit from anti-static materials. The anti-static blend is a preferred material for spray powder-coating of parts, as the anti-static properties produce a more direct spray stream compared to powders without anti-static properties that produce a wide spray stream. A wide spray stream results in wasted powder that does not reach the part to be coated and melt-finished to a coating. Packaging for electronic parts, such as trays on which electronic components are placed, and translucent packaging films, also benefit from being made of the anti-static blend of the invention.

The anti-static film of the invention may be a part of a multi-layer structure. In one embodiment, a thin layer of the anti-static layer is attached to one or both sides of a polyolefin layer to form a multi-layer film. The thin layer(s) of the anti-static film can be the same or different, and are each in the range of from 5 to 100 microns in thickness, and preferably from 10 to 30 microns in thickness.

EXAMPLES

TPS (thermoplastic starch) was obtained from Teknor Apex.

Several different PEBAX® poly ether-block-polyamide resins (available from Arkema Inc.) were obtained, and were molded into plaques. (Samples A, B, and C).

Blends of TPS with PEBAX resins, TPS with polyethylene (PE), and TPS with polylactic acid (PLA) were made by melt-blending at a 50/50 weight ratio, and forming into plaques. All plaques were made by injection molding.

Intrinsic Surface Resistance of each plaque was measured and is shown in Table 1.

TABLE 1

Intrinsic Surface Resistance

| Sample | A (comp) | B (comp) | C (comp) | D | E | F | G | H (comp) | I (comp) |
|---|---|---|---|---|---|---|---|---|---|
| Product | PEBAX® MH1657 | PEBAX® MV1074 | PEBAX® 30R51 | PEBAX® MH1657/ TPS | PEBAX® MV1074/ TPS | PEBAX® 30R51/ TPS | PEBAX® 2533/ TPS | PE/ TPS | PLA/ TPS |
| Ratio (weight %) | 100 | 100 | 100 | 50/50 | 50/50 | 50/50 | 50/50 | 50/50 | 50/50 |
| Surface Resistance (Ohm; log scale) | 9 | 9.1 | 9 | 7.5 | 7.6 | 7.8 | 8.5 | 9.2 | 11.5 |
| Notes | PA6 based Hydrophilic | PA12 based Hydrophilic | PA11 based Hydrophilic | | | | PA12 based, Hydrophobic | | |

Several samples of the PEBAX® resin and TPS/resin blends, were melt blended into polypropylene (PP) or acrylonitrile butadiene styrene (ABS) using an injection molding machine to make plaques. The injection molding machine was run at 220-240° C. for the PP matrix, and at 180-200° C. for the ABS matrix. The mold temperature was at 40° C. Surface Resistance was measured and is reported in Table 2.

TABLE 2

Antistatic Additives in ABS and PP homopolymer

| Composition | Surface Resistance (Ohm; log scale) |
|---|---|
| ABS (comp) | 14 |
| ABS + 20% PEBAX ® MH1657 (comp) | 10.3 |
| ABS + 20% (PEBAX ® MH1657/TPS at 50/50%) | 10.2 |
| ABS + 20% PEBAX ® 30R51 (comp) | 10.3 |
| ABS + 20% (PEBAX ® 30R51/TPS at 50/50%) | 10.4 |
| PP | 14 |
| PP + 20% PEBAX ® MV1074 (comp) | 11.3 |
| PP + 20% (PEBAX ® MV1074/TPS at 50/50%) | 10.3 |
| PP + 20% PEBAX ® 30R51 (comp) | 11.4 |
| PP + 20% (PEBAX ® 30R51/TPS at 50/50%) | 10.2 |

As can be seen from the data, the intrinsic antistatic performance of the TPS/PEBAX® alloys are higher than the PEBAX® resin by itself (about one to 1.5 decades lower—indicating better antistatic performance.) It is noted that TPS itself is too brittle, and therefore antistatic properties of the pure TPS could not be obtained.

The blend of a TPS with a TPE (such as PEBAX® resin) can be blended in various thermoplastic polymer matrices to provide antistatic properties that are good or better than the TPE alone. Thus TPS can be used to both lower cost and increase the anti-static properties. The antistatic performance of the PEBAX® resin/TPS alloys as antistatic additives in thermoplastic matrices will depend on the morphology developed upon processing and the viscoelastic properties of the materials.

What is claimed is:

1. An antistatic polymer composition comprising a blend of:
   a) a polymer matrix, and
   b) 5-40 weight percent (based on the total polymer composition) comprising a homogeneous blend of TPS and TPE consisting of:
      1) 10 to 90 weight percent of thermoplastic starch (TPS);
      2) 10 to 90 weight percent of a hydrophilic thermoplastic elastomer (TPE) selected from the group consisting of: a) block copolymers having polyester blocks and polyether blocks (COPE), b) block copolymers having polyurethane blocks and polyether or polyester blocks (TPU), and c) block copolymers having polyimide blocks and polyether blocks (PEBA), wherein said TPE comprises at least 30 percent by weight of polyethylene glycol;
   c) optionally up to 5 weight percent of other additives.

2. The polymer composition of claim 1, wherein said TPE comprises at least 50 percent by weight of polyethylene glycol.

3. The polymer composition of claim 1, wherein said hydrophilic TPE comprises 50-100 percent by weight of TPU and 0 to 50 percent by weight of at least one other hydrophilic TPE.

4. The polymer composition of claim 1, wherein said hydrophilic TPE comprises 50-100 percent by weight of PEBA and 0 to 50 percent by weight of at least one other hydrophilic TPE.

5. The polymer composition of claim 1, wherein said TPS/TPE alloy comprises from 40 to 70 weight percent of said TPS, and from 30 to 60 weight percent of said TPE.

6. The polymer composition of claim 1, wherein said TPS/TPE alloy is present at from 10 to 25 weight percent.

7. The polymer composition of claim 1, wherein said polymer matrix comprises a thermoplastic or a thermoset, selected from the group consisting of: polyolefins, polyethylene of all densities, polypropylene, polybutylene, polycarbonate, polyvinyl chloride, polyvinylidene chloride, fluoroplymers, polyvinylidene fluoride, polyvinyl fluoride; polytetrafluorethylene, epoxy resins, (meth)acrylic polymers and copolymers, polyesters, polyethylene terephthalate, polybutylene terephthalate, polylactic acid, vinyl aromatic polymers, polystyrene, high-impact polystyrene (HIPS), acrylonitrile-butadiene-styrene (ABS) copolymers, acrylonitrile-styrene-acrylate (ASA) copolymers, styrene acrylonitrile (SAN) copolymers, methacrylate-acrylonitrile-butadiene-styrene (MABS) copolymers, styrene-butadiene copolymers (SB), styrene-butadiene-styrene block (SBS) copolymers and their partially or fully hydrogenated derivatives, styrene-isoproene copolymers styrene-isoprene-styrene (SIS) block copolymers and their partially or fully hydrogenenated derivatives, styrene-(meth)acrylate copolymers, styrene-methyl methacrylate copolymers (S/MMA), polyether ether ketone, and polyether ketone ketone.

8. A material comprising the polymer blend composition of claim 1, wherein said material is a film, sheet, fiber, powder, pellet, or profile.

9. The material of claim 8, wherein said material is a molded part of an electronic device, packaging for electronic materials, or a powder for powder-coating.

* * * * *